Patented Apr. 14, 1936

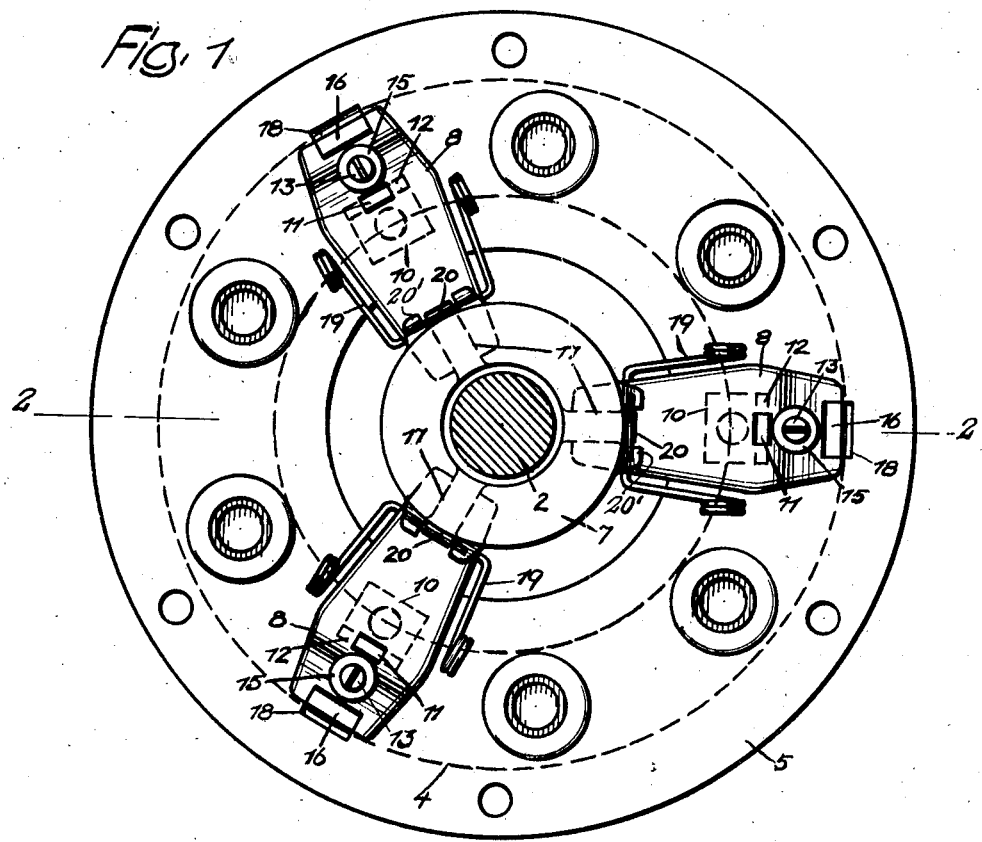

2,037,610

UNITED STATES PATENT OFFICE 2,037,610

DISK CLUTCH

Heinrich Wörner, Bischofsheim, Germany, assignor to Fichtel & Sachs A. G., Schweinfurt-on-the-Main, Germany, and Mecano G. m. b. H., Frankfort-on-the-Main, Germany Application May 9, 1932, Serial No. 610,179
In Germany May 30, 1931

3 Claims. (Cl. 192—68)

This invention relates to disk clutches in which the clutch disk secured to the driven shaft is pressed between the fly wheel disk of the engine and a pressure ring which is acted upon by a number of pressure springs arranged in a circle. The lifting of the pressure ring from the clutch disks for declutching is effected in such clutches by means of a number of levers with unequal arms which are made operative together by a ring actuated by a foot lever. The present improvement consists in the special simplicity of the form and arrangement of these levers, whereby the manufacture is simplified and made cheaper without detrimentally affecting the reliability of the clutch.

In the accompanying drawing Fig. 1 is an elevation of the clutch according to the invention, Fig. 2 is a longitudinal section on the line 2—2 of Fig. 1.

Figs. 3 and 4 illustrate details of parts of the clutch.

The fly wheel disk 1 mounted on the motor shaft forms in a known manner the casing for the clutch. The driven shaft 2, to which the clutch disk 3 is secured, projects into the casing. The pressure ring 4 rotating with the housing 1 serves the purpose of pressing the clutch disk 3 against the fly wheel disk 1, when the clutch is engaged under the action of the pressure springs 6, which are mounted in sleeves on the casing cover 5. The clutch is also disengaged in a known manner by depressing a foot lever so that the ring 7 is displaced towards the casing and turns a number of radial levers 8 with unequal arms which lift the pressure ring 4 from the clutch disk 3.

In contradistinction to the known arrangements the levers 8 are stamped out of thick sheet and are brought into a form which remains unaltered even with considerable stresses by bending back the edges 9. The pivotal points for the levers 8 are formed by supports 10, secured to the casing cover 5, which engage by means of the pins 11 in corresponding openings 11' in the levers 8 so that the levers can turn about the shoulders 12 of the supports 10. The short limb of each lever 8 is hingedly connected by a bolt 13 with the pressure ring 4. For this purpose at both sides of the hole 13' for the bolt, a channel 14 is pressed in the lever 8, in which bears the lower surface of the nut 15 which surface is made in the form of a round bar. For further securing the proper combination of the lever 8 with the neighbouring parts against the considerable centrifugal forces acting on the rotating clutch, the levers 8 are provided at both ends with slots 16' and 17' which engage on the one hand pins 16 of the pressure ring 4 and on the other hand pins 17 on the ring 7. The pins 16 of the pressure ring 4 serve at the same time for carrying it along with the fly wheel disk as they are led through corresponding adjoining openings 18 in the housing cover 5.

In order to hold the ring 7 resiliently in contact with the levers 8, there is provided for each of these a U-shaped wire spring 19, the two ends of which are secured at both sides of each lever 8 in the casing cover 5. The central transverse part of the spring 19 is embraced by the hook-shaped end 20'' of a stirrup 20, which, by means of lateral extensions 20''', is suspended in two projections as at 20' on the ring 7.

When the clutch is engaged, the springs 6 exercise the necessary pressure on the pressure ring 4 to set the clutch disk 3 in rotation with the fly wheel disk 1. The clutch is disengaged by depressing a foot lever whereby the ring 7 is moved towards the casing 1 and depresses the levers 8. These turn about the shoulders 12 of the supports 10 so that by means of the bolts 13 the pressure ring 4 is lifted from the clutch disk 3. The alteration of the angle between the levers 8 and the bolts 13 occurring in this case is allowed for by the channels 14 in the short limbs of the levers 8, and the nuts 15 mounted therein. As the clutch disk 3 is worn away by friction at the engagement of the clutch, the pressure ring 4 gradually approaches the friction surface on the fly wheel disk 1. On account of the great inequality of the arms of the levers 8, this causes the ring 7 to move away from the clutch housing 1 to a corresponding extent. In order for practical reasons to hold the ring 7 in its original position when the clutch is engaged, that is to prevent the ring 7 moving away from the casing 1 as the clutch disk 3 becomes worn, the nuts 15 are screwed out on the bolts 13 until the desired effect is obtained by turning the bolts. The channel 14 on the lever 8 and the nut 15 which is made with a corresponding shape coact in such a manner that the bolt 13 can be turned against a certain resistance but without being further secured will remain in its final position in spite of vibrations due to the movement of the vehicle.

What I claim is:

1. A disk clutch including a fly-wheel disk forming a casing adapted for connection with a drive shaft, a driven shaft, a clutch disk on the driven shaft and arranged adjacent the fly-wheel disk and in the casing formed thereby, a pressure ring arranged within the casing for coacting with the opposite face of the clutch disk, a cover for the casing, springs mounted on the cover for pressing the clutch disk against the fly-wheel disk, a plurality of levers on the outside of the cover, pins extending from the ring and projecting through the cover, an operating ring for the levers, pins on the operating ring, the lever being provided with guiding slots at both ends for engaging the pins on both of said rings, and a quickly detachable fastening means between the outer ends of the levers and the pressure ring.

2. A disk clutch as claimed in claim 1, wherein means is provided for mounting the levers on the cover including slots provided adjacent the medial portions of the levers, and supports fastened to the outer surface of the cover and having the outer ends reduced to leave shoulders so as to be engaged with the last mentioned slots in the levers in order that the levers may swing about the shoulders.

3. A disk clutch as claimed in claim 1, wherein U-shaped springs are secured in the cover of the casing on both sides of the levers, and stirrups connect the springs with the ring for operating the levers.

HEINRICH WÖRNER.